United States Patent  [10] Patent No.: US 6,532,841 B2
Medico et al.  [45] Date of Patent: Mar. 18, 2003

(54) GEAR SELECTOR DEVICE FOR AUTOMATIC TRANSMISSION

(75) Inventors: Giuseppe Medico, Rivoli (IT); Giovanni Tornatore, S. Benigno Canavese (IT); Cesare Sola, Valperga (IT); Gianluigi Lenzi, Bologna (IT)

(73) Assignee: Magneti Marelli Powertrain S.p.A. (IT)

( * ) Notice: Subject to any disclaimer, the term of this patent is extended or adjusted under 35 U.S.C. 154(b) by 0 days.

(21) Appl. No.: 09/917,793

(22) Filed: Jul. 31, 2001

(65) Prior Publication Data

US 2002/0046621 A1 Apr. 25, 2002

(30) Foreign Application Priority Data

Aug. 1, 2000 (IT) .................................. TO00A0769

(51) Int. Cl.[7] .............................................. F16H 59/04
(52) U.S. Cl. ..................................... 74/335; 74/473.31
(58) Field of Search .................... 74/473.18, 473.19, 74/473.3, 473.31, 335; 180/333, 336

(56) References Cited

U.S. PATENT DOCUMENTS

| | | | |
|---|---|---|---|
| 4,649,768 A | | 3/1987 | Kusaka et al. |
| 5,365,803 A | * | 11/1994 | Kelley et al. ............... 180/333 |
| 5,520,066 A | * | 5/1996 | Tueri ....................... 200/61.57 |
| 5,865,705 A | * | 2/1999 | Shamoto et al. ............ 477/79 |
| 6,073,511 A | * | 6/2000 | Umezawa et al. ....... 74/473.25 |
| 6,151,977 A | * | 11/2000 | Menig et al. ............. 74/336 R |

FOREIGN PATENT DOCUMENTS

EP 0999085 5/2000

OTHER PUBLICATIONS

Wright, P. Formula1 Steering Wheels, [onine], [retrieved on May 04, 2001]. Retrieved from the Internet: <URL:http://www.insidef1.com/ft/ft00347.html>.*
Guidelines for Use. Ferari F 355 F1, [oneline], [retrieved on May 04, 2001]. Retrieved from the Internet: <URL:http://www.ferrari.it/vetture/oggi.e/355F1pri.html>.*
"Une boite sequentielle pour la F 355" Revue Automobile, CH, Hallwag, S.A. vol. 92, No. 32, Jul. 31, 1997, p. 13.
EPO Search Report Dated Oct. 05, 2001, Application No. 01118465.

* cited by examiner

*Primary Examiner*—Ankur Parekh
(74) *Attorney, Agent, or Firm*—Hall, Priddy, Myers & Vande Sande

(57) ABSTRACT

Gear selector device of an automatic transmission in which a first lever which can be operated manually is movable between a rest position and a first operating position to control an down-shift of the gear and a second lever which can be operated manually is movable between a rest position and a first operating position to control an up-shift of the gear engaged. The first and the second lever produce respective second operating positions to control the following operations: the engagement of reverse gear; the selection of an automatic mode of operation of the automatic transmission; and the selection of a 'sports'-type of mode of operation of the automatic transmission.

10 Claims, 2 Drawing Sheets

GEAR SELECTOR DEVICE FOR AUTOMATIC TRANSMISSION

The present invention relates to a gear selector device for automatic transmission.

BACKGROUND OF THE INVENTION

As is known, the vehicles provided with automatic transmission are equipped with selector devices disposed on the driver's side and suitable for enabling the driver to give commands to select the gears.

For example, selector devices are known which comprise a lever extending from the tunnel of the passenger compartment of the vehicle and suitable for enabling the driver to perform the sequential selection of the gears of the automatic transmission. Also known are selector devices comprising pushbuttons (disposed on the steering wheel and/or on the dashboard of the vehicle for example) which can be used to select a particular mode of operation of the automatic transmission. Inter alia this particular mode of operation may achieve the engagement of reverse gear.

The selector devices of known type are often inconvenient to operate in that in order to control the gearbox and/or command a particular mode of operation, the driver has to let go of the steering wheel temporarily and partially and operate either the lever or the button.

Obviously in these conditions both the driver's concentration, and his capacity to manoeuvre the vehicle are reduced, thereby reducing driving safety.

SUMMARY OF THE INVENTION

The object of the present invention is to produce a gear selector device for automatic transmission which enables the gears to be selected with ease and which enables a particular mode of operation of the automatic transmission to be selected at the same time.

This object is achieved by the present invention in that it relates to a gear selector device for automatic transmission as set forth in the claims.

BRIEF DESCRIPTION OF THE DRAWINGS

For a better understanding of the invention an embodiment thereof will now be described, purely by way of non-exhaustive example and with reference to the accompanying drawings, in which.

In diagrammatic form

In diagrammatic form

In diagrammatic form

DETAILED DESCRIPTION OF THE INVENTION

Figure 1:
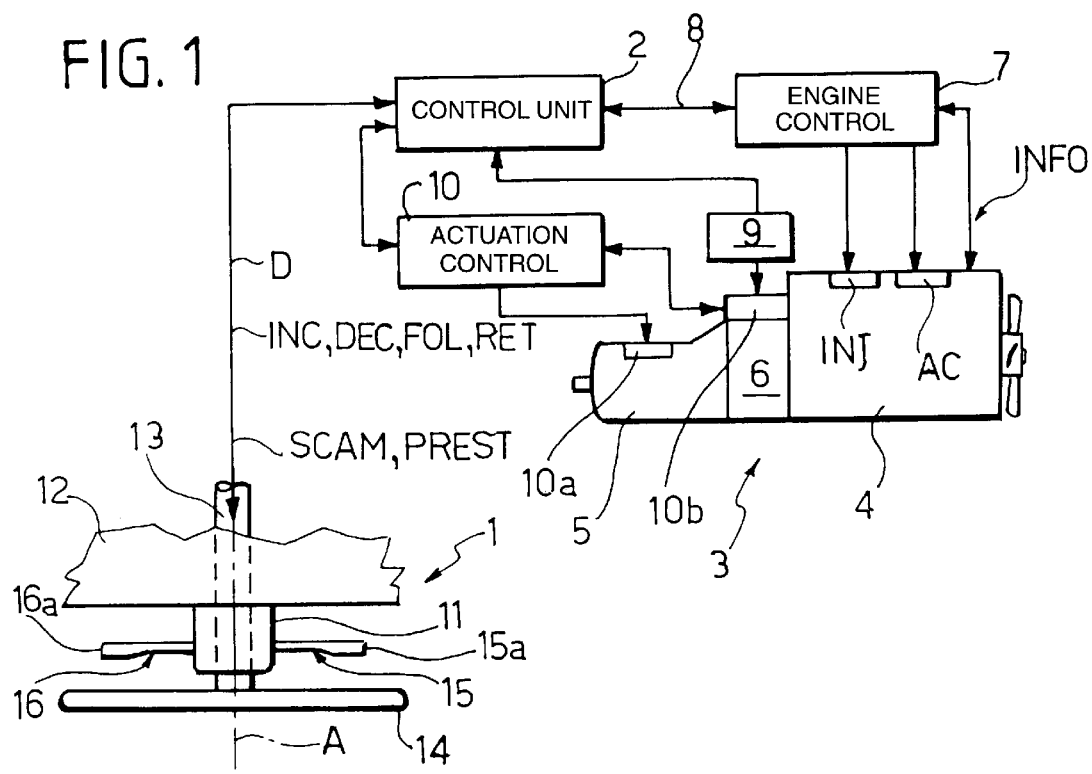
FIG. 1 shows a block diagram of an automatic transmission unit controlled by a gear selector device produced according to the specifications of the present invention.

With reference to FIG. 1, in its entirety 1 denotes a gear selector device for automatic transmission cooperating, with data exchange along a data line D, with an electronic control unit 2 suitable for operating an automatic transmission unit 3.

As input the automatic transmission unit 3 receives mechanical power via a shaft (not shown) of an internal combustion engine 4 (petrol or diesel) and comprises a gearbox 5 and a clutch 6 interposed between an output shaft (not shown) of the engine 4 and the input shaft (not shown) of the said gearbox 5, which supplies mechanical power to the wheels of a vehicle (not shown).

The engine 4 cooperates with an electronic engine control circuit 7 which receives as input a plurality of information parameters INFO (number of engine revolutions, temperature of cooling water etc.) measured in the said engine 4 and supplies command signals to an ignition unit AC (shown in diagrammatic form) and to an injection unit INJ (shown in diagrammatic form).

The electronic control unit 2 cooperates with the electronic engine control circuit 7 to which it is connected via a bidirectional data transmission line 8 and it is further connected to sensors 9 suitable for performing measurements of parameters such as, for example, measurement of the speed of the vehicle, the position of the clutch pedal, the pressure and temperature on a hydraulic circuit (not shown) which supplies the automatic transmission unit 3.

The electronic control unit 2 is further connected to an actuation control device 10 to control, in known manner, via respective actuator units 10a, 10b (shown in diagrammatic form), the selection and the engagement/disengagement of the gears of the gearbox 5, and the opening/closing of the clutch 6.

In particular the control unit 2 sends signals to the actuator units 10a, 10b to control:

the up-shift of the gear engaged in the gearbox 5;
the down-shift of the gear engaged in the gearbox 5; and
the engagement of reverse gear in the gearbox 5.

In a manner entirely known the control unit 2 may also produce a particular mode of operation by the transmission unit 3, of automatic type, according to which the gears are selected and engaged automatically on the basis of data signals (such as number of engine revolutions, position of the vehicle's accelerator pedal) and with no need for manual control on the driver's part. Finally the electronic unit 2 produces a particular level of operation of the transmission unit 3 ('sports' mode of operation) in which the gears are selected in extremely short times and the clutch 6 is closed again quickly thus simulating a 'sports' type of manual operation of the transmission unit.

Finally the electronic control unit 2 is connected to the gear selector device 1 fitted to a steering switch unit 11 which extends from a dashboard 12 (shown in part and in diagrammatic form) of the vehicle (not shown) and houses in its own interior a steering column 13 of the steering of the vehicle (not shown).

Integrally connected to an end of the steering column 13 is a steering wheel 14 which is disposed at an end of the steering switch unit 11 and is coaxial to a longitudinal axis A of the steering column 13.

The gear selector device 1 comprises a first and a second lever 15, 16 fitted to the steering switch unit 11 and suitable for enabling the driver of the vehicle (not shown) to control the transmission unit 3. Alternatively the first and a second lever 15, 16 may be fitted on the steering wheel 14.

In particular, the selector device 1 is suitable for generating signals which can be interpreted by the control unit 2 to control the transmission unit 3, and the following are generated in particular:

a gear up-shift signal INC to control an up-shift, a single one for example, of the gear engaged;

a gear down-shift signal DEC to control a down-shift, a single one for example, of the gear engaged;

a neutral signal FOL to control the disposition in neutral of the gearbox 5; and a reverse gear signal RET to control the engagement of reverse gear in the gearbox 5.

The first and the second lever 15, 16 also enable the driver of the vehicle to select a first and a second mode of operation of the transmission unit 3 denoted as mode of operation with automatic transmission and respectively mode of operation with semi-automatic transmission, transmitting a SCAM signal to the electronic control unit 2.

In the semi-automatic transmission mode of operation the request to engage/disengage the gear in the gearbox 5 is performed manually by the driver by means of the first and the second lever 15, 16 whereas in the automatic transmission mode of operation every request to engage/disengage the gear in the gearbox 5 is effected by the electronic control unit 2 which, as noted above, up-shifts/down-shifts the gear transmission ratio as a function of specific input parameters such as the speed of the vehicle, the position of the accelerator pedal for example.

When the electronic control unit 2 receives the SCAM signal and the transmission unit is in the semi-automatic transmission mode of operation, the electronic control unit 2 deactivates the semi-automatic transmission mode and activates the automatic transmission mode.

When the electronic control unit 2 receives the SCAM signal, the transmission unit 3 is in an automatic type of mode of operation and the vehicle's speed is greater than zero, the electronic control unit 2 deactivates the automatic transmission mode and activates the semi-automatic mode.

Finally, the first and the second lever 15, 16 enable the vehicle's driver to select a first and a second level of performance of the transmission unit 3 by means of a PREST signal; in particular, the first level of performance called the basic mode of operation enables the driver to select a first speed which completes the opening or closing of the clutch 6 and engagement or disengagement of a new gear, whereas the second level of performance corresponding to the 'sports' mode of operation enables the driver to select a second speed for opening/closing the clutch 6 and engagement and disengagement of a new gear; in particular the first speed relating to the basic mode of operation is lower than the second speed relating to the 'sports' mode of operation.

When the electronic control unit 2 receives the PREST signal and the transmission unit 3 is in the basic mode of operation, the electronic control unit 2 disables the latter and enables the 'sports' mode of operation, whereas when the electronic control unit 2 receives the PREST signal and the transmission unit 3 is in the 'sports' mode of operation, the electronic control unit 2 disables the latter and enables the basic mode of operation.

Figure 2:
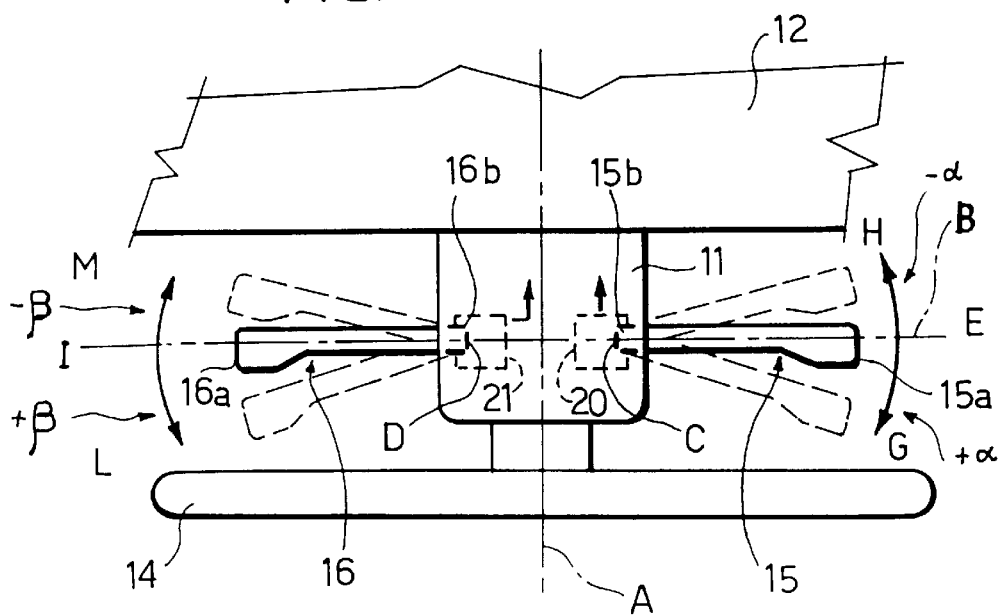
FIG. 2 shows the gear selector device of FIG. 1 produced according to a first embodiment.

With reference to FIG. 2, the first and the second lever 15, 16 are disposed in symmetrical manner with respect to the axis A of the steering column 13, and extend radially from the steering switch unit 11 along an axis B transverse to the axis A.

The first and the second lever 15, 16 have a rectilinear elongated shape with a first end portion which can be grasped 15a, 16a suitable for being operated by the driver and a second end portion 15b, 16b hinged to the steering switch unit 11 and rotating about a respective axis C, D transverse to the axis A and at right angles to the axis B.

The first lever 15 rotates about the axis C between a rest position E (shown by the continuous line) in which it is substantially parallel and coaxial to the axis B, and a first and second operating position G, and H (shown by the broken line); in particular in the first operating position G the first lever 15 has a first inclination +α with respect to the axis B and towards the steering wheel 14; in the second operating position H the first lever 15 has a second inclination −α with respect to the axis B and towards the dashboard 12.

In other words, the first lever 15 is movable from the rest position E to the first operating position G with an angular movement of the lever 15 towards the steering wheel 14 and is movable from the rest position E to the second operating position H with an angular movement of the lever 15 towards the dashboard 12.

The second lever 16 rotates about the axis D between a rest position I (shown by the continuous line), in which it is substantially parallel and coaxial to the axis B, and a first operating position L, in which it is inclined with respect to the axis B towards the steering wheel 14 and a second operating position M in which it is inclined with respect to the axis B towards the dashboard 12 (the positions L and M are shown by the broken line); in particular, in the first operating position L the second lever 16 has a first inclination +β with respect to the axis B and towards the steering wheel 14; in the second operating position M the second lever has a second inclination −β with respect to the axis B and towards the dashboard 12.

In other words, the second lever 16 is movable from the rest position I to the first operating position L with a movement of the second lever 16 towards the steering wheel 14 and is movable from the rest position I to the second operating position M with a movement of the second lever 16 towards the dashboard 12.

The first and the second lever 15, 16 are associated with respective position sensors 20, 21 (microswitches which can be operated by the angular movement of the levers 15, 16 for example) suitable for detecting the disposition of the lever in the respective first position, second position and rest position to generate the electrical signals INC, DEC, FOL, RET, SCAM AND PREST which can be interpreted by the electronic control unit 2.

For example, each position sensor 20, 21 detects three positions (E, H, G and I, L, M) and generates three respective output signals 00, 01, 10 which are associated with the three output signals of the other sensor thus constituting the electrical signals INC, DEC. FOL, RET, SCAM AND PREST.

As shown in the Table below, if the first and the second lever 15, 16 are disposed in the first operating position G and respectively in the rest position I, the gear selector device 1 generates the gear up-shift signal INC which, once received by the electronic control unit 2, brings about the up-shift of the transmission ratio engaged in the gearbox 5.

If the first and second lever 15, 16 are disposed in the rest position E and respectively in the first operating position L, the gear selector device 1 generates the gear down-shift signal DEC which, once received by the electronic control unit 2, brings about a down-shift of the transmission ratio engaged in the gearbox 5.

If the first and the second lever 15, 16 are both disposed in the respective first operating positions G, L the gear selector device 1 generates a neutral gear signal FOL which, once received by the electronic control unit 2, brings about the neutral gearbox 5 status.

If the first and the second lever 15, 16 are disposed in the second operating position H and respectively in the rest position I, the selector device 1 generates the reverse gear signal RET which, once received by the electronic control unit 2, brings about the engagement of reverse gear in the gearbox 5.

If the first and the second lever 15, 16 are disposed in the rest position E and respectively in the second operating position M, the gear selector device 1 generates the gear signal SCAM, which, as described above and once received by the electronic control unit 2, brings about the selective enabling/disabling of the semi-automatic/automatic transmission mode of operation.

If the first and the second lever 15, 16 are disposed in the respective second operating positions H and M, the selector device 1 generates the performance signal PREST which, as described above and once received by the electronic control unit 2, brings about the enabling/disabling of the basic/'sports' mode of operation.

The above-mentioned operations are summarized in the Table below:

| FIRST LEVER POSITION | SECOND LEVER POSITION | SIGNAL GENERATED | OPERATION IN GEARBOX | Gearbox status |
|---|---|---|---|---|
| Operating position G | Rest position I | INC | Gear up-shift | Any |
| Rest position E | Operating position L | DEC | Gear down-shift | Any |
| Operating position G | Operating position L | FOL | Neutral | Any |
| Operating position H | Rest position I | RET | Reverse gear | any |
| Rest position E | Operating position M | SCAM | Automatic transmission mode of operation | Semi-automatic transmission mode of operation |
| Rest position E | Operating position M | SCAM | Semi-automatic transmission mode of operation | Automatic transmission mode of operation and vehicle speed > 0 |
| Operating position H | Operating position M | PREST | Basic mode of operation | 'Sports' mode of operation |
| Operating position H | Operating position M | PREST | 'Sports' mode of operation | Basic mode of operation |

In use, the first and the second lever 15, 16 are suitable for maintaining the respective rest positions E, I in the absence of a command from the driver; in this regard the levers 15 and 16 are associated with flexible devices (not shown) suitable for disposing the first and the second lever 16 into the respective rest positions I, E in the absence of external forces applied to the said first and second lever 15, 16.

To command an up-shift of the gears in use, the driver of the vehicle places the first lever 15 in the first operating position G without operating the second lever 16 which remains in the rest position I whereas to command a down-shift of the gears in use, the driver of the vehicle places the second lever 16 in the first operating position L without operating the first lever 15 which remains in the rest position E.

To command a disposition of the gearbox into neutral, the user of the vehicle places both the levers 15 and 16 in the respective first positions G and L whereas to engage reverse gear he leaves the position of the second lever 16 (disposed in the rest position I) unchanged and briefly moves the first lever 15 into the respective second operating position H. At this point the gear selector device 1 sends the reverse gear signal RET to the electronic control unit 2 which commands the actuation of reverse gear in the gearbox 5. The user then releases the first lever 15 which automatically returns to the respective rest position E.

When the vehicle is operating with a semi-automatic mode of operation and the driver wishes to command an automatic mode of operation, the second lever 16 is placed in the second position M, keeping the first lever 15 in the rest position E; consequently at that point the gear selector device 1 sends the SCAM signal to the electronic control unit 2 which commands the activation of the automatic mode of operation.

The user then releases the second lever 16 which automatically returns to the respective rest position I.

When the vehicle is operating with an automatic mode of operation and the driver wishes to command a semi-automatic mode of operation, the second lever 16 is placed in the second position M, keeping the first lever 15 in the rest position E; consequently at that point the gear selector device 1 sends the SCAM signal to the electronic control unit 2 which commands the activation of the semi-automatic mode of operation.

The user then releases the second lever 16 which automatically returns to the respective rest position I.

When the vehicle is operating with a basic command mode of the automatic transmission and the driver of the vehicle wishes to command a 'sports' mode of operation, both the levers 15 and 16 are placed in the respective second positions H and M; consequently the gear selector device 1 sends the PREST signal to the electronic control unit 2 which commands the activation of the 'sports'-type mode of operation. The user then releases both the levers 15 and 16 which automatically return to the respective rest positions E and I.

When the vehicle is operating with a 'sports' command mode of the automatic transmission and the driver of the vehicle wishes to command a basic mode of operation, both the levers 15 and 16 are placed in the respective second positions H and M; consequently the gear selector device 1 sends the PREST signal to the electronic control unit 2 which commands the activation of the basic-type mode of operation. The user then releases both the levers 15 and 16 which automatically return to the respective rest positions E and I.

Figure 3:
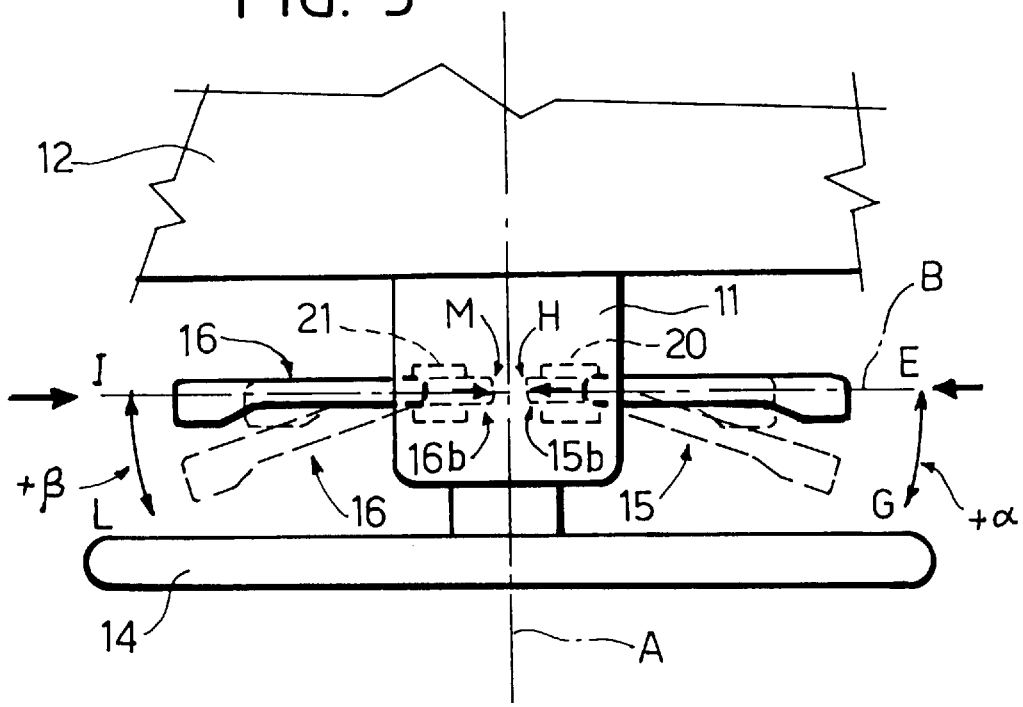
FIG. 3 shows the gear selector device of FIG. 1 produced according to a second embodiment.

According to a variant shown in FIG. 3, the second operating position H is obtained, as an alternative to the angular rotational movement described in FIG. 2, with an axial translatory movement of the lever 15 along the axis B. In particular, the first lever 15 is movable along the axis B from the rest position E towards the second operating position H in which it is still aligned with the axis B and is of shorter length in that the portion 15b of the lever enters into the steering switch unit 11, operating the microswitch 20. The first operating position G is obtained in a manner similar to that described with reference to FIG. 2.

Similarly the second lever 16 is movable along the axis B from the rest position I towards the second operating position M in which it is still aligned with the axis B and is of shorter length in that the portion 16b of the lever enters into the steering switch unit 11, operating the microswitch 21. The first operating position L is obtained in a manner similar to that described with reference to FIG. 2.

Figure 4:
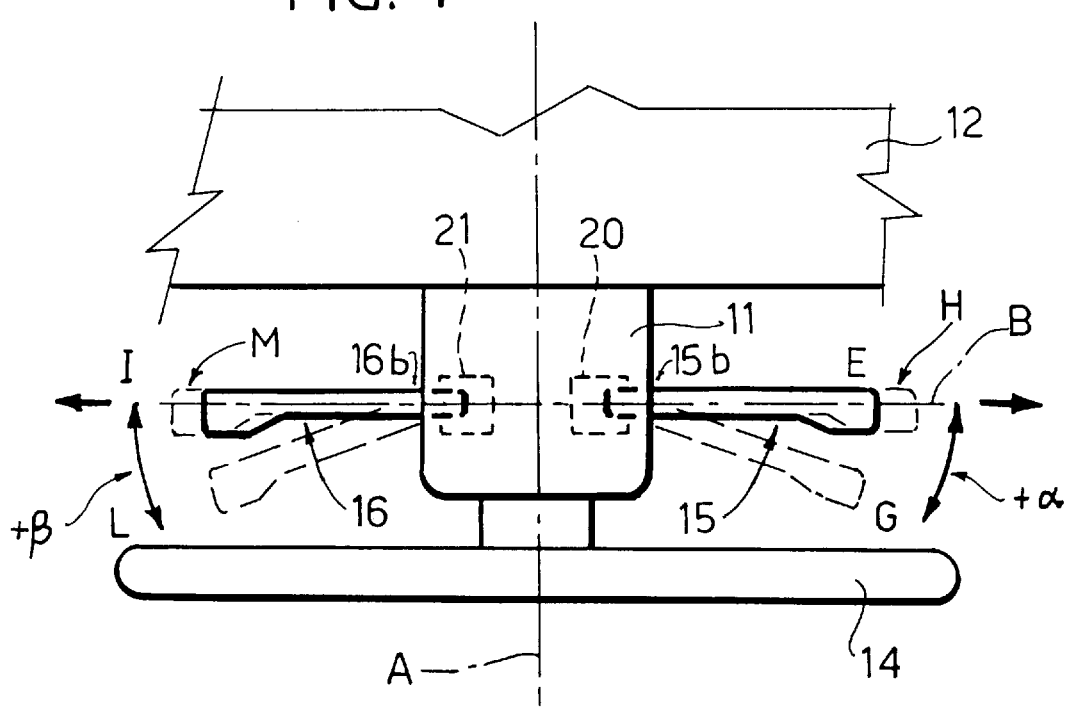
FIG. 4 shows the gear selector device of FIG. 1 produced according to a third embodiment.

According to a variant shown in FIG. 4, the second operating position H is obtained, as an alternative to the angular rotational movement described in FIG. 2, with an axial translatory movement along the axis B. In particular, the first lever 15 is movable along the axis B from the rest position E towards the second operating position H in which it is still aligned with the axis B and is of longer length in that the portion 15b of the lever comes out of the steering switch unit 11 for a stretch, operating the microswitch 20. Similarly the second lever 16 is movable along the axis B from the rest position I towards the second operating position M in which it is still aligned with the axis B and is of longer length in that the portion 16b of the lever comes out of the steering switch unit 11 for a stretch, operating the microswitch 21.

The advantages which can be obtained with the gear selector device 1 described above are as follows.

Firstly, it enables the driver of the vehicle fully to control the automatic transmission without ever removing his hands from the steering wheel.

Furthermore, the number of components required for engaging reverse gear, and for selecting the automatic or 'sports' type of mode of operation, is reduced.

Finally it will be evident that numerous modifications and variants may be introduced to the gear selector device 1 described, all of which come within the scope of the inventive idea, as defined in the accompanying claims.

What is claimed is:

1. Gear selector device of an automatic transmission which can be operated by means of actuator means controlled by electronic control means (2); the selector device (1) comprising:

a first lever (15) movable between at least one rest position (E) and a first operating position (G) to command an up-shift (INC) of a gear engaged in a gearbox (5);

a second lever (16) movable between at least one rest position (I) and a first operating position (L) to command a down-shift (DEC) of the gear engaged in said gearbox (5), characterized in that at least one (15, 16) of said first lever or of said second lever achieves a second operating position (H; L) to generate a respective signal (RET, FOL, SCAM, PREST) and command in said automatic transmission (3) at least one of the following operations:

engagement of reverse gear;

disposition of the gearbox in neutral;

selection of an automatic mode of operation of said automatic transmission; and selection of a 'sports' mode of operation of said automatic transmission.

2. Gear selector device according to claim 1, characterized in that said first lever (15) is movable from said first rest position (E) to said first operating position (G) with a movement of rotation of said first lever (15) according to a first angular direction (+α).

3. Gear selector device according to claim 2, characterized in that said first lever (15) is movable from said rest position (E) to said second operating position (H) with a movement of rotation of said first lever (15) according to a second angular direction (−α).

4. Gear selector device according to claim 1, characterized in that said second lever (16) is movable from said rest position (I) to said first operating position (L) with a movement of rotation of said second lever (16) according to a first angular direction (+β).

5. Gear selector device according to claim 4, characterized in that said second lever (16) is movable from said rest position (I) to said second operating position (M) with a movement of rotation of said second lever (16) according to a second angular direction (−β).

6. Gear selector device according to claim 1, characterized in that said first lever (15) is movable from said rest position (E) to said second operating position (H) with an axial displacement movement.

7. Gear selector device according to claim 1, characterized in that said second lever (16) is movable from said rest position (I) to said second operating position (M) with an axial displacement movement.

8. Gear selector device according to claim 1, characterized in that said first and second levers (15, 16) extend from a steering switch unit (11).

9. Gear selector device according to claim 1, characterized in that said first and second levers (15, 16) extend from a steering wheel (14).

10. Gear selector device according to claim 1, characterized in that said first lever (15) and said second lever (16) control said automatic transmission according to the following operating logic:

| POSITION OF FIRST MEANS WITH LEVER (15) | POSITION OF SECOND MEANS WITH LEVER (16) | OPERATION IN AUTOMATIC TRANSMISSION |
| --- | --- | --- |
| First operating position (G) | Rest position (I) | Gear up-shift |
| Rest position (E) | First operating position (L) | Gear down-shift |
| First operating position (G) | First operating position (L) | Disposition of gearbox in neutral |
| Second operating position (H) | Rest position (I) | Engagement of reverse gear |
| Rest position (E) | Second operating position (M) transmission mode | Automatic of operation |
| Second operating position (H) | Second operating position (M) | Sports' mode of operation |

* * * * *